UNITED STATES PATENT OFFICE 2,318,626

PRODUCTION OF PRODUCTS RICH IN UNSATURATED HYDROCARBONS

Mathias Pier, Heidelberg, and Ernst Donath, Mannheim, Germany; vested in the Alien Property Custodian No Drawing. Application September 24, 1938, Serial No. 231,612. In Germany September 30, 1937

2 Claims. (Cl. 260—449)

The present invention relates to the production of hydrocarbons containing more than two carbon atoms in the molecule from mixtures of carbon monoxide with hydrogen and in particular into hydrocarbon products which are rich in unsaturated hydrocarbons.

In the reaction of carbon monoxide with hydrogen at atmospheric or only moderately increased pressures of for example 5, 10 or 20 atmospheres, there are usually formed mainly saturated hydrocarbons which knock strongly when used as fuels in motors. In order to increase the amount of unsaturated hydrocarbons in the reaction product and thus to improve the non-knocking properties of the benzine, it has already been proposed to carry out the reaction with less hydrogen than is necessary for complete reaction of the carbon monoxide. In many cases, however, the activity of the catalyst then subsides very soon for example by deposition of carbon, and moreover part of the carbon monoxide may remain unconverted.

We have now found that a product rich in unsaturated hydrocarbons can be obtained in a simple manner by using for the catalytic reaction in the gas phase at atmospheric or slightly increased pressures, gas mixtures which contain less than 2 parts by volume of hydrogen for each part by volume of carbon monoxide and adding further hydrogen in the course of the reaction.

It is advantageous to work by starting from a gas containing between 0.9 and 1.5 parts by volume of hydrogen for each part by volume of carbon monoxide and maintaining this ratio during the reaction by the addition of further hydrogen. It is preferable to use in all, at least such an amount of hydrogen that there are about 2 parts by volume of hydrogen for each part by volume of carbon monoxide and that the reaction proceeds according to the equation:

$$nCO + 2nH_2 = (CH_2)_n + nH_2O$$

For carrying out the said process there may be used as suitable catalysts in particular cobalt or nickel on carriers, if desired together with other substances, or mixtures of iron and copper, sintered metals of the iron group, metals of the iron group with manganese and copper or with aluminum or with substances withdrawing water, such as thorium oxide, or iron which has been obtained by the reduction of ferrosoferric oxide, if desired with the addition of silica acid, titanium oxide or alumina.

The procedure may, for example, be as follows:

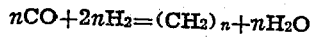

A mixture of carbon monoxide and hydrogen containing between 0.9 and 1.5 parts by volume of hydrogen for each part by volume of carbon monoxide is led at atmospheric pressure and at a temperature of from 160° to 350° C. over a catalyst of the said kind. At a plurality of places in the reaction chamber hydrogen is led in in the cold or preheated state in such manner that at every part of the reaction chamber practically the aforesaid ratio of hydrogen to carbon monoxide is maintained. In all, such an amount of hydrogen is used that there are about 2 parts by volume of hydrogen for each part by volume of carbon monoxide.

As a rule it is necessary, especially when working at atmospheric pressure, to use gases which are free from sulphur and sulphur compounds. It is also advantageous that there should be present only small amounts of inert constituents, such as carbon dioxide or nitrogen. For example there may be used as initial gas a watergas which has been desulphurized and which contains 45 per cent of carbon monoxide and 51 per cent of hydrogen and during the course of the reaction there may be added hydrogen which has been prepared from the same watergas by reaction of the carbon monoxide with steam and washing out the carbon dioxide formed.

The content of olefines in the final products depends upon the conditions employed in particular on the nature of the catalyst and on the height of the temperature. The lower boiling fractions of the said products usually contain more than 20 per cent and more particularly between 50 and 80 per cent of olefines.

The following example will further illustrate the nature of this invention but the invention is not restricted to this example.

Example

A watergas freed from sulphur compounds which contains 42.7 per cent of carbon monoxide, 49.1 per cent of hydrogen and the remainder nitrogen and carbon dioxide is led at 195° C. at atmospheric pressure over a catalyst of cobalt, thorium and sodium applied to kieselguhr. In the reaction, which leads to the formation of benzine and hydrocarbons of higher boiling point, carbon monoxide and hydrogen are used up in the ratio 1:2 so that the gas becomes poorer in hydrogen. There is therefore added at four places in the reaction chamber about equal portions of a gas free from sulphur compounds and consisting to the extent of 95 per cent of hydrogen the amount added being in all 36 liters for each 100 liters of watergas. For each cubic meter of the gas used in all, there are obtained 112 grams of liquid product by condensation and absorption from the gases leaving the reaction vessel. The benzine obtainable therefrom by distillation up to 180° C. has an octane value of 55.

By working under otherwise identical conditions but by adding the whole of the hydrogen at the start, about the same yield of liquid products is obtained, but the benzine has an octane value of only 47.

What we claim is:

1. In the production of hydrocarbon products by the catalytic conversion of carbon monoxide and hydrogen in which a mixture of carbon monoxide and hydrogen is passed through a reaction chamber containing a catalyst for the said reaction, the improved method for producing a hydrocarbon product rich in unsaturated hydrocarbons, which comprises passing a gas mixture which contains less than 2 parts by volume of hydrogen for each part by volume of carbon monoxide into the inlet end of the reaction chamber, adding further hydrogen to the reaction mixture at spaced points along the reaction chamber in such amounts that there are less than 2 parts by volume of hydrogen for each part by volume of carbon monoxide in every part of the said reaction chamber, the total volume of hydrogen supplied to the chamber being substantially twice the volume of carbon monoxide supplied to the chamber.

2. The process as defined in claim 1 wherein the initial gas mixture contains between 0.9 and 1.5 parts by volume of hydrogen for each part by volume of carbon monoxide and the hydrogen added along the reaction chamber is supplied in such amounts as to maintain this ratio throughout the reaction chamber.

MATHIAS PIER.
ERNST DONATH.